United States Patent
Yang et al.

(10) Patent No.: US 11,270,302 B1
(45) Date of Patent: *Mar. 8, 2022

(54) CONFIGURABLE ROBOTS FOR NETWORK BASED PROCESSES

(71) Applicant: CAPTAIN CAPITAL MANAGEMENT LLC, Basking Ridge, NJ (US)

(72) Inventors: Hanchao Yang, New York, NY (US); Jing Huang, New York, NY (US); Zhongyuan Yu, Basking Ridge, NJ (US)

(73) Assignee: Captain Capital Management LLC, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,151

(22) Filed: Jul. 28, 2020

Related U.S. Application Data (63) Continuation of application No. 16/412,134, filed on May 14, 2019, now Pat. No. 10,878,415.

(51) Int. Cl.
*G06Q 40/00* (2012.01)
*G06Q 20/38* (2012.01)
(Continued)

(52) U.S. Cl.
CPC ......... *G06Q 20/389* (2013.01); *G06F 3/0482* (2013.01); *G06F 3/0484* (2013.01);
(Continued)

(58) Field of Classification Search
USPC ............... 705/39, 38, 37, 36, 35, 40, 26, 14; 719/328; 717/108; 709/226, 227;
(Continued)

(56) References Cited

U.S. PATENT DOCUMENTS 6,920,373 B2 * 7/2005 Xi .......................... B25J 9/1689
  318/611
8,001,013 B2 * 8/2011 Serbanescu ........ G06Q 30/0601
  705/26.4
(Continued)

OTHER PUBLICATIONS

Virtual Network Functions exploitation through a prototype resource management framework; 2014 International Conference on Telecommunications and Multimedia (TEMU) (pp. 24-28); George Mastorakis; Evangelos Markakis; Evangelos Pallis; Constandinos X. Mavromoustakis; Georgios Skourletopoulos. (Year: 2014).*
(Continued)

*Primary Examiner* — Tien C Nguyen
(74) *Attorney, Agent, or Firm* — Foley & Lardner LLP (57) ABSTRACT

Embodiments described herein introduce systems and methods of configurable robots for network based processes. An application server may provide a graphical user interface (GUI) including different modular components of virtual robots. The application server may provide quantitative models for virtual robots with a variety of trading styles. A user may be able to create his/her own virtual robot by dragging and dropping different modular components according to the user's requirements. The virtual robots may automatically conduct transactions and manage wealth for the user. The virtual robot may automatically and dynamically perform quantitative analysis, risk management, trading activity, and portfolio management. In addition to creating a customized virtual robot, a user may lease his/her virtual robot and collect payments from the renters. A user may also offer trading signals generated by his/her robots for other users to purchase.

20 Claims, 7 Drawing Sheets

(51) Int. Cl.
*G06F 3/0484* (2022.01)
*G06N 3/08* (2006.01)
*G06N 20/10* (2019.01)
*G06Q 20/06* (2012.01)
*G06F 3/0482* (2013.01)

(52) U.S. Cl.
CPC .............. *G06N 3/08* (2013.01); *G06N 20/10* (2019.01); *G06Q 20/0658* (2013.01); *G06Q 2220/00* (2013.01)

(58) Field of Classification Search
USPC ................. 715/704; 726/9, 6; 706/25, 45; 235/375, 380
See application file for complete search history.

(56) References Cited

U.S. PATENT DOCUMENTS

| | | | | |
|---|---|---|---|---|
| 8,128,500 | B1* | 3/2012 | Borst | A63F 13/71 463/40 |
| 8,843,585 | B1* | 9/2014 | Normann | A63F 13/60 709/217 |
| 9,208,432 | B2* | 12/2015 | Buibas | G06N 3/04 |
| 9,375,847 | B2* | 6/2016 | Angle | G05D 1/0022 |
| 9,643,320 | B2* | 5/2017 | Davey | B25J 11/009 |
| 9,902,069 | B2* | 2/2018 | Farlow | G05D 1/0246 |
| 9,987,749 | B2* | 6/2018 | Nagendran | B25J 9/1615 |
| 10,055,323 | B2* | 8/2018 | Moore | H04W 4/20 |
| 2004/0107125 | A1* | 6/2004 | Guheen | G06Q 99/00 705/319 |
| 2006/0230064 | A1* | 10/2006 | Perkowski | G06Q 30/0641 |
| 2017/0132625 | A1* | 5/2017 | Kennedy | G06F 16/2379 |

OTHER PUBLICATIONS

Distributed computing in robotics and automation; IEEE Transactions on Robotics and Automation (vol. 18, Issue: 4, pp. 409-420); D. Brugali, M.E. Fayad; Aug. 1, 2002. (Year: 2002).*
Afef Gueidi, Hamza Gharsellaoui, Samir Ben Ahmed, Robotics data real-time management based on NoSQL solution, 2017 IEEE/ACIS 16th International Conference on Computerand Information Science (ICIS) (pp. 131-136), Aug. 4, 2017 (Year: 2017).
Nagrath, Vineet, Morel, Olivier, Malik, Aamir, Saad, Naufal, Dynamic electronic institutions in agent oriented cloud robotic systems, SpringerPlus, 4, 103. Mar. 1, 2015 (Year: 2015).

* cited by examiner

CONFIGURABLE ROBOTS FOR NETWORK BASED PROCESSES

CROSS REFERENCE TO RELATED APPLICATIONS

This application is a continuation application of U.S. patent application Ser. No. 16/412,134, filed May 14, 2019, which is incorporated herein by reference in its entirety for all purposes.

TECHNICAL FIELD

This application is directed to customizable or configurable robots for network-based processes.

BACKGROUND

As the processing power of computers allow for greater computer functionality and the Internet technology era allows for interconnectivity between computing systems, many computer applications are available for online processes or online execution. However, most computer applications for online processes or online execution are not customizable or configurable. For example, conventional software solutions utilize a static method to provide the computer application functions based on existing code of a full software package.

To combat this problem, many existing software solutions have attempted to provide configurable systems by allowing users to update or modify the corresponding code. However, this method requires the users to be familiar with complex coding algorithms, and this task has been proven difficult because most users have little or no software programming knowledge. The technical challenges become even more acute when the method requires the users to be familiar with the computer application functions. For example, to configure an online trading computer application, the user may have to be familiar with the trading process. This task can be difficult for users with no such expertise. As a result, the conventional solutions for configurable computer applications process great restriction because they require users to understand both programming and the application functions.

SUMMARY

For the aforementioned reasons, what is needed are user configurable systems and an interface for the user to configure these systems. What is further needed are configurable systems that may not require the user to have coding knowledge.

Disclosed herein are systems and methods capable of addressing the above-described shortcomings and may also provide any number of additional or alternative benefits and advantages. For example, the embodiments described herein may provide a quantitative, automated, decentralized, and intelligent computer platform for financial markets, including a stock market, future market, forex market, cryptocurrency market, bond market, option market, and the like. The embodiments described herein may decentralize computer-implemented wealth management services by providing quantitative strategies using robotic trading applications. More specifically, the wealth management platform may comprise a graphical user interface (GUI) including different modular components. A user may be able to configure a customized virtual robot by selecting (e.g., dragging and dropping) different modular components according to the user's requirements. The virtual robots may automatically conduct transactions and manage wealth for the user at any time. In addition to creating a customized virtual robot, a user may also utilize one or more customized virtual robots configured by other users. Furthermore, a user may lease the customized virtual robot for use by others. The user may create, rent, or lease virtual robots by simply interacting with the GUI provided by the wealth management platform without any requirements in coding or trading expertise. The methods and systems described herein provide a platform that allows user to create virtual robots, select virtual robots, and deploy selected virtual robots for automated electronic transactions.

In an embodiment, a computer-implemented method comprises displaying, by a computer, a graphical user interface with a plurality of modules configured to be combined forming one or more virtual robots, wherein each of the one or more virtual robots performs a plurality of electronic transactions; generating, by the computer, a first virtual robot based upon a first user selecting a first set of modules from the plurality of modules and the first user further selecting corresponding executable functions in each module in the first set of modules; generating, by the computer, a second virtual robot based upon a second user selecting a second set of modules from the plurality of modules and the second user further selecting corresponding executable functions in each module in the second set of modules; deploying, by the computer, the first virtual robot to perform electronic transactions for the first user in an electronic transaction platform based upon a first deployment instruction received from the first user; deploying, by the computer, the second virtual robot to perform electronic transactions for the second user in the electronic transaction platform based upon a second deployment instruction received from the second user; receiving, by the computer, a selection of the first virtual robot and the second virtual robot from a plurality of virtual robots from a third user; executing, by the computer, an executable coded script to retrieve blockchain data records associated with the third user; and deploying, by the computer, the first virtual robot and the second virtual robot to perform electronic transactions for the third user in the electronic transaction platform in response to the computer determining based upon the blockchain data records that the third user is authorized to utilize the first virtual robot and the second virtual robot.

In another embodiment, a computer system comprises a first computing device associated with a first user, a second computing device associated with a second user, a third computing device associated with a third user, a computer in connection with the first, second, and third computing devices and configured to: display a graphical user interface on the first and second computing devices with a plurality of modules configured to be combined forming one or more virtual robots, wherein each of the one or more virtual robots performs a plurality of electronic transactions; generate a first virtual robot based upon the first user selecting a first set of modules from the plurality of modules and the first user further selecting corresponding executable functions in each module in the first set of modules; generate a second virtual robot based upon the second user selecting a second set of modules from the plurality of modules and the second user further selecting corresponding executable functions in each module in the second set of modules; deploy the first virtual robot to perform electronic transactions for the first user in an electronic transaction platform based upon a first deployment instruction received from the first user; deploy the second virtual robot to perform electronic transactions for the second user in the electronic transaction platform based upon a second deployment instruction received from the second user; receiving, by the computer, a selection of the first virtual robot and the second virtual robot from a plurality of virtual robots from the third user operating the third computing device; execute an executable coded script to retrieve blockchain data records associated with the third user; and deploy the first virtual robot and the second virtual robot to perform electronic transactions for the third user in the electronic transaction platform in response to the computer determining based upon the blockchain data records that the third user is authorized to utilize the first virtual robot and the second virtual robot.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the subject matter described herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments described herein introduce systems and methods for configuring, selecting, and deploying virtual robots that conduct automated transactions. An application server may develop quantitative models for virtual robots by leveraging technologies based on complex networks, quantum mechanics, chaos theory, and artificial intelligence. The trading decision process may be fully automated and modularized, assembled in a virtual robot capable of performing quantitative analysis, risk management, trading activity, and portfolio management. The virtual robots may have a variety of trading styles, from passive to active, conservative to aggressive, low frequency to high frequency, according to the user's preference.

The application server may modularize the trading process into eight components. Each of the modules may be a component of a virtual robot. A user may choose and combine different parts to create customized virtual robots. The application server may provide a social trading platform (STP) as a marketplace for users to utilize (e.g., rent) third-party virtual robots and select or configure (e.g., purchase) trading signals. A trading signal may be a suggestion for entering a trade on a currency pair, usually at a specific price and time. The trading signals may be account trading signals generated from one or more robots and manual trades. The system allows users who configure virtual robots to list those virtual robots on the social trading platform for use by others. Virtual robot users may view each robot's historical return and volatility level to identify the best match for their investment portfolio.

Because the trading signals include financial information that is valuable for non-professionals, a user may also offer trading signals generated by the user's customized robots for other users to utilize. Other users may utilize the trading signals (e.g., by making a payment for each trading signal). In the social trading platform, a user may benefit from not only configuring, utilizing, trading, and leasing virtual robots, but also providing and obtaining trading signals.

A virtual robot may be a combination of software modules (or software components) that may perform computer operations (e.g., financial market trading) without human intervention. The virtual robot may make automated trading decisions to buy and/or sell cryptocurrency or other digital assets within a network. The virtual robot may reside anywhere in the network, such as at a server, a client device, or a combination thereof. Once deployed in the network, the virtual robot may continuously perform automated operations based on its configuration. More particularly, the virtual robot may automatically analyze the movement and the price of cryptocurrencies and digital assets and automatically decide (without user intervention) whether to buy or sell one or more digital assets or cryptocurrencies.

The virtual robot may dynamically select a quantitative model based on the movement and prices of digital assets and cryptocurrency. The virtual robot may take in as inputs various factors of an existing marketplace, dynamically select a quantitative model, and execute a buying or a selling operation based on the output of the selected quantitative model. The quantitative models in the virtual robot may be based on complex network, quantum mechanics, chaos theory, and artificial intelligence.

A single user may customize and deploy different virtual robots for different types of marketplaces. The user may customize a first virtual robot for a high-volume fast-trading market, such as financial markets, including a stock market, future market, forex market, cryptocurrency market, bond market, option market, or any other digital asset marketplace. The first virtual robot may include sophisticated quantitative models and may require intensive server side computations. For low-volume low-risk trading, the user may customize a second virtual robot. The second virtual robot may include less sophisticated quantitative models and may run on a client side personal device of the user.

In addition to performing dynamic and automated buying and selling operations, the virtual operates may generate trading signals. The trading signals may include trading recommendations or market forecasts to inform trading decisions. For example, a user may utilize a trading signal generated by a first virtual robot to perform a first trade in the marketplace. Alternatively, a virtual robot of the first user may automatically capture the trading signal generated by the first virtual robot to execute a buying or selling operation in the marketplace.

Embodiments disclosed herein may also facilitate creating, configuration, obtaining, utilizing, and deploying virtual robots as well as configuring and utilizing trading signals. A first user may configure multiple robots and may offer these virtual robots to others in in a marketplace. A second user may obtain a virtual robot. When the virtual robot executes an operation for the second user, a computer implementing the marketplace may compensate the first user by increasing a value for the first user (e.g., compensating the first user). Furthermore, the first user may deploy the multiple robots to generate market signals and offer the generated market signals to the second user in the marketplace.

Figure 1:
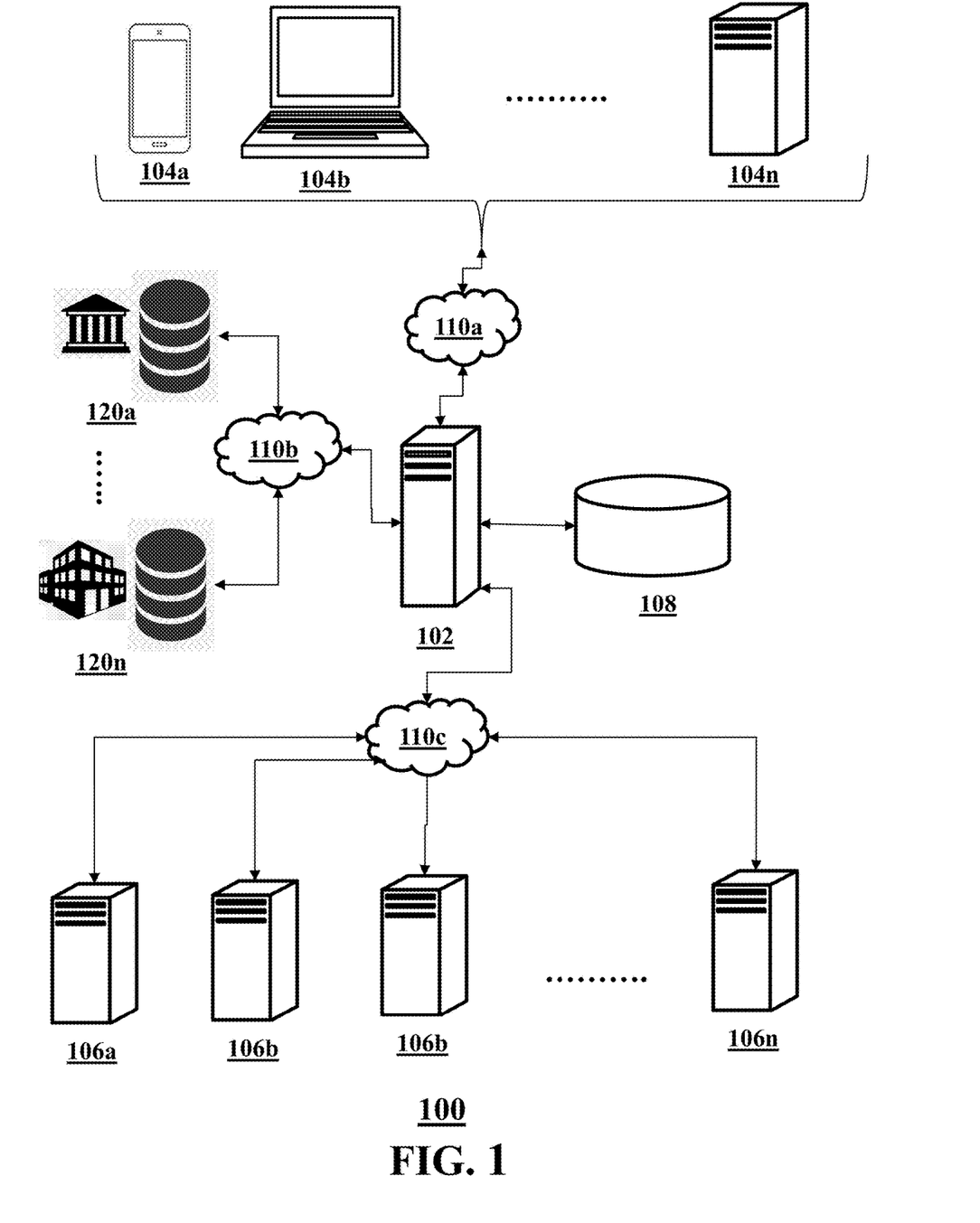
FIG. 1 shows an illustrative network environment for configurable robots, according to an embodiment.

FIG. 1 shows an illustrative network environment 100 for configurable virtual robots, according to an embodiment. The network environment 100 may include an application server 102, access devices 104a-104n (collectively and commonly referred to as 104), distributed network nodes 106a-106e (collectively and commonly referred to as 106), a database 108, and networks 110a-110c (collectively and commonly referred to as 110). It should be understood that network environment 100 shown in FIG. 1 is merely illustrative and network environments with additional components, fewer components, and substitute components are to be considered to be within the scope of this disclosure.

The application server 102 may be any type of computing system comprising one or more processors executing the wealth management using virtual robots described throughout this disclosure. Non-limiting examples of the application server 102 include a server computer, a desktop computer, a laptop computer, a tablet computer, and a smartphone. The application server 102 may communicate with the access devices 104 and the distributed network nodes using the networks 110. Furthermore, the application server 102 may be electronically coupled to or otherwise access to the database 108. The application server 102 may provide a graphical user interface (GUI) on the access devices 104 to allow a user to select one or more components of virtual robots and input parameters and features for the virtual robots. Based on the user's selection and configuration, the application server 102 may build one or more virtual robots for the user. The virtual robots of the application server 102 may dynamically manage the user's wealth by executing investment decisions for the user. The application server 102 may link the user's virtual robot application account with other exchange accounts of the user and save the user account information the database 108. Furthermore, the application server 102 may collect payments from the users subscribing the virtual robot services. The application server may use the blockchain hosted by the distributed nodes 106 for subscription fee collection and dynamically checking the users' account balance.

The access devices 104 may be any kind of computing device used by users to communicate with the application server 102. Non-limiting examples of access device 104 may include a mobile phone 104a, a personal computer 104b, and a server 104n. It should however be understood that these access devices 104 are merely illustrative and other computing devices should be considered within the scope of this disclosure. An access device 104 may display a portal (e.g., on a webpage or on a standalone computer application) that may be used by a user to access the services provided by the application server 102. The application server 102 may therefore present data and/or perform wealth management using virtual robots as services to the access devices 104 in the illustrative network environment 100.

The distributed network nodes 106 may be any kind of computing devices hosting the blockchain. Each of the network nodes 106 may store a copy of the blockchain. Furthermore, each of the network nodes 106 may receive updates to the blockchain and accordingly update the respective copies of the blockchain. The network nodes 106 may also participate in authenticating the blockchain by transmitting a copy of the system blockchain or a portion thereof to an entity (e.g., another network node 106) that is attempting to determine the latest valid blockchain. Each of the distributed network nodes 106 may be any computing device configured to store a blockchain and process any updates thereto. Non-limiting examples of the network nodes 106 may include a server computer, a desktop computer, a laptop computer, a tablet computer, and a smartphone. In some embodiments, the application server 102 itself may perform as a network node of the distributed network nodes 106.

The database 108 may be any kind of database providing off-chain storage functionality and providing storage to computer program instructions of the application server 102 and user account information. In some embodiments, the database 108 may be integrated within the application server 102. As an off-chain storage facility, the database 108 may store documents, reports, and/or any other type of data referenced in the blockchain. As storage for computer program instructions for the applications server 102, the database 108 may store executable binaries for the operations of the application server 102. The database 108 may also store the modular components of virtual robots, including cross exchange data source module, cryptocurrency filter module, quantitative strategy module, decision making module, back testing module, position control module, order execution module, and report generation module executed by the application server 102. The database 108 may also store cross exchange data including user financial accounts from different exchange platforms.

The networks 110 may be any type of communication medium such as a local area network (LAN), metropolitan area network (MAN), and/or a wide area network (WAN). For instance, the networks 110 may be include the internet. The network 110 may be a combination of various wired and wireless links capable of carrying data packets in between the various servers and computers within the network environment 100.

The application server 102 may also communicate with a plurality of external data providers 120a-120n (collectively or commonly referred to as 120). Non-limiting examples of the external data providers 120 may include a hedge fund 120a or a mutual fund 120n, or any other third-party exchange platforms. The application server 102 may retrieve data records from the corresponding databases maintained by the external data providers 120. In some embodiments, the application server 102 may provide a GUI for the user to configure the linking of different accounts from the external data providers 120a-120n. For example, the user may determine which accounts for the application server to link. The user may choose or input one or more accounts of the external data providers 120a-120n by interacting with the GUI. The application server 102 may access the user's account information from the external data providers 120a-120n, and save the account information in the database 108. As a result, the application server 102 may be able to cross exchange data among the user's different accounts from different platforms, and integrate those accounts for wealth management.

Figure 2:
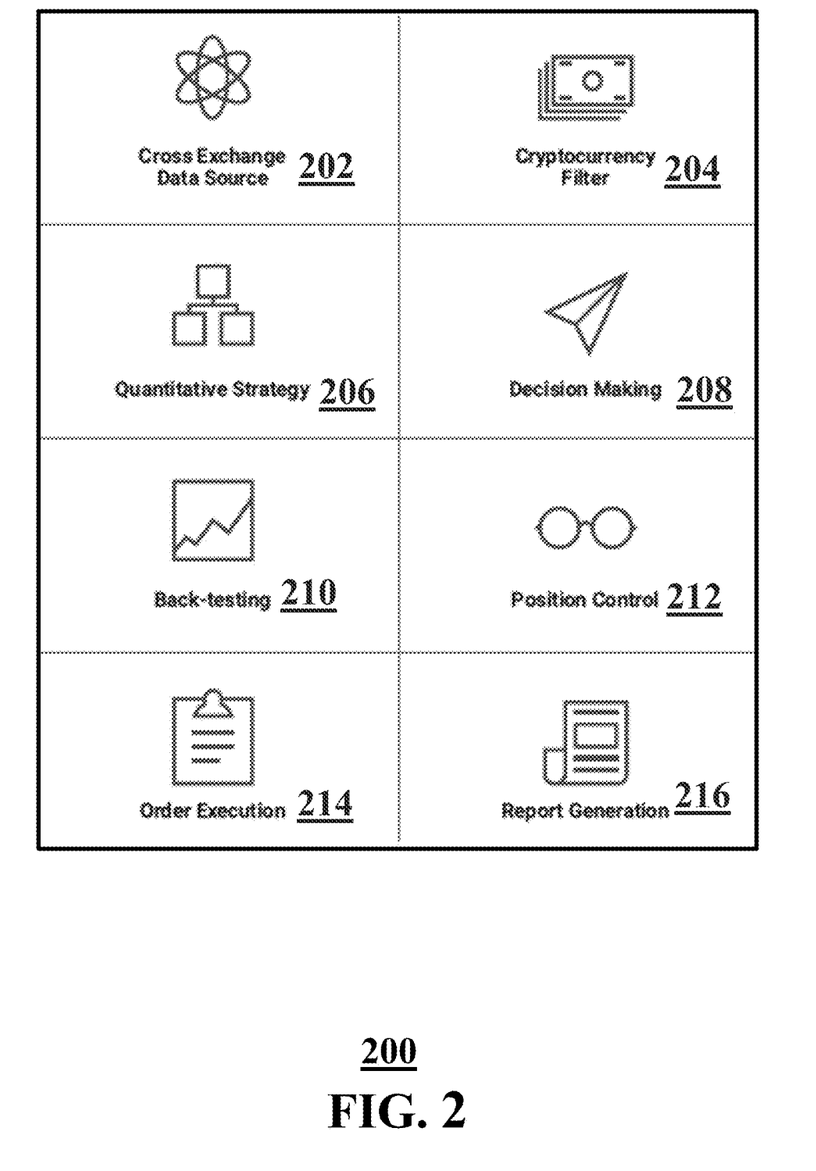
FIG. 2 shows modular components of a virtual robot, according to an embodiment.

FIG. 2 shows modular components 200 of a virtual robot application, according to an embodiment. The virtual robot application server may comprise eight modules: cross exchange data source module 202, cryptocurrency filter module 204, quantitative strategy module 206, decision making module 208, back testing module 210, position control module 212, order execution module 214, and report generation module 216.

The cross exchange data source module 202 of the application server may integrate the database and software development kit (SDK) of the virtual robot application with other exchange accounts of the user, such as Binance, Bitfinex, Bibox, CEX, Coincheck, Gdax, and the like. For example, assuming a user has a virtual robot application account and multiple other accounts with other third-party exchange platforms, the application server may link the user's virtual robot application account with the user's other exchange platforms accounts. In some embodiments, the application server may provide a GUI for the user to configure the linking of different accounts. For example, the user may determine which accounts for the application server to link. The user may choose or input one or more existing accounts of other platforms by interacting with the GUI. The application server may access the user's account information from other electronic transaction platforms, and save the account information in a local database. As a result, the application server may be able to cross exchange data among the user's different accounts from different platforms, and integrate those accounts for wealth management.

The cryptocurrency filter module 204 of the application server may comprise a set of filtering rules to locate a subgroup of coins and tokens suitable for certain quantitative strategies. In some embodiments, the application server may determine the set of filtering rules using machine learning technology. For example, emotion index is a tool which aims to measure the feelings of a customer, a group of customers or stakeholders towards a company, product or service. The emotion index calculated from social networks may reflect the average investment attitudes of the majority of users from different platforms. The application server may determine one or more filtering rules on certain coins and tokens based on the emotion index. For example, the accuracy of upside trading signal may increase for tokens with positive sentiment. Similarly, the application server may determine the filtering rules based on other technical indicators for the trending tokens.

In some embodiments, the filtering rules may be based on the user's requirements and customization. For example, the application server may provide a GUI that allows a user to input parameters or features of the required coins or tokens. A user may choose parameters, such as recently listed, crypto payment solutions, and cross-chain technologies for filtering purposes. The application server may determine the proper coins and tokens satisfying the parameters and features for each strategy.

The quantitative strategy module 206 of the application server may provide more than 30 advanced trading models and more than 100 technical indicators. The quantitative strategy module 206 may cover a variety of investment styles including momentum, mean-reverting, event driven, relative value, arbitrage, buy & hold, long & short, and the like. The quantitative strategy module 206 of the application server may provide a GUI for the user to select one or more trading strategies. The user may build one or more virtual robots by selecting different trading strategies and assembling the different strategies into a robot. By selecting one or more strategies to create a robot, a user may enjoy crypto wealth management services equivalent to investing into a collection of hedge funds and mutual funds.

The quantitative strategies (e.g., trading strategies) may make investment decision using different algorithms, such as artificial intelligence, neural networks, machine learning, and the like. Different trading strategies may make different decisions. For example, a more aggressive strategy may make a positive decision, while a more conservative strategy may make a negative decision. A user may choose the trading strategies with different investment styles based on the user's preferences and needs.

The decision making module 208 of the application server may make the investment decision based on one or more trading strategies selected by the user. When there are multiple trading strategies chosen, the decision making process may become complicated. The decision making module 208 may simplify the decision making process to basic logical operations of "and" "or" logics among the multiple trading strategy. For example, each trading strategy may make its own binary decision (e.g., either 0 or 1, with 0 representing false and 1 representing true). The decision making module 208 may combine the decision from different trading strategies (using "and"/"or" logics) to make a final decision. In some embodiments, the application server may use different rules to combine the different decisions. For example, the application server may use decision trees, machine learning, or any other optimization algorithms to combine the different decisions. Furthermore, the application server may assign a weight factor for each decision made by the corresponding strategy. The application server may combine the different decisions based on the weight factors.

In some embodiments, the application server may provide scientific decision making tools such as Bayesian inference, neural networks, support vector machines, deep learning, and many other machine learning techniques to help users select the right trading strategies according to their needs.

The back testing module 210 of the application server may test and train the virtual robots before placing the virtual robots into live trading environment. The back testing module 210 may conduct simulations to test performance of the strategies and decision making rules of the virtual robot and determine the expected return and risk loss of a certain virtual robot.

The position control module 212 of the application server may manage market risks. The application server may set a maximum investment amount for each virtual robot. For example, one virtual robot may take 10 bitcoins as its maximum investment amount. In addition, the application server may assign a maximum amount for each digital asset (e.g., cryptocurrency) of a virtual robot. For example, one virtual robot may take 5 bitcoins and 8 tokens as the maximum amount. In some embodiments, the application server may provide a GUI for the user to assign a certain amount of tokens or cryptocurrencies to a virtual robot or manage the allocation of funds. The application server may use artificial intelligence, system risk measurements, and Copula CoVaR (Conditional Value at Risk) model to manage the trading positions of users.

The order execution module 214 of the application server may execute a large order using automated and pre-programmed trading instructions. Depending on the liquidity of each digital asset (e.g., cryptocurrency), simple sending a large market order is not always the best trading execution.

Signal trading slippage may lead to basis loss even when the trading signals of the robot make a profit. Algorithmic trading is a method of executing a large order using automated and pre-programmed trading instructions. The application server may provide two algorithmic order execution functions: volume weighted average price (VWAP) and time weighted average price (TWAP) for all users. Nonetheless, users can still send a limit or market order without incurring any trade execution fees. Furthermore, many cryptocurrency exchange platforms offer their own algorithmic routers to help traders reduce market impact and save money on transaction cost.

Report generation module 216 of the application server may dynamically generate and record a detailed trading report with each trade order execution. For example, the generated report may comprise the funds of the users, the list of executed transactions, the amount of each transaction, the timestamp of the transaction, the profit/loss of the transaction. The report generation module 216 may play the traditional roles of an accountant and a trading assistant.

The application server may release a particular type of application tokens, which is NET tokens. The NET tokens may be utility tokens which can be used to purchase upgrade function parts for virtual robots, subscription services from advanced virtual robots, and trading signals from various virtual robot creators. NET token's valuation may partially depend on virtual robot price, which further depends on robot demand and supply. Thus, virtual robot designers and investors are key factors that may affect the NET token valuation. The application server may list NET tokens on cryptocurrency exchanges, giving users complete freedom to open trading and access to the latest trading modules. The application tokens, such as NET tokens may offer all participants (e.g., investor, traders, and developers) a chance to become the creators to a decentralized investment ecosystem and the pioneers of the wealth manage system.

The application server may determine an application power value for each user. Users with higher power value may have superior access to creating and renting more advanced robots and be rewarded with more application tokens (e.g., NET tokens). For robots with limited management cap, NET token holders with the higher amount of application power may have priority of access. The application power value may be determined based on token holdings, referral rewards, community contributions. Users with more NET tokens may have higher application power. Users may receive higher application power as referral rewards for being referees. Furthermore, the application server may value community members with great commitments and contributions to the ecosystem by giving such users higher application power. For example, the application server may determine the application power according to the users' contribution and reputation scores on the platform, such as position and negative behaviors in the ecosystem. The application server may recalculate the application power value periodically (e.g., on a weekly basis). The application power may be non-transferable and non-divisible among accounts and cannot be traded on cryptocurrency exchange platforms.

To make investment decisions, the application server may utilize complex network series theory to capture the co-movement features among multiple digital assets (e.g., cryptocurrencies) by analyzing the structures and fluctuation of long and short networks dynamically. The application server may use news impact system in classical mechanics (NISCM) to predict price movement of target cryptocurrencies. NISCM may be a methodology capable of making directional predictions in the market based on news and social user sentiment. The application server may use NISCM to provide interpretation of complicated price-event scenarios which can, therefore, improve the accuracy of price prediction. Furthermore, the application server may use parallel crypto network constructor (PCNC) to construct the complex network of crypto assets on large-scale trading data, which may lead to a thorough understanding of the crypto portfolio network structure. The application server may also use network portfolio theory for large-scale portfolio optimization. The application server may determine the network's most efficient portfolios from thousands of assets within just a few minutes.

Figure 3:
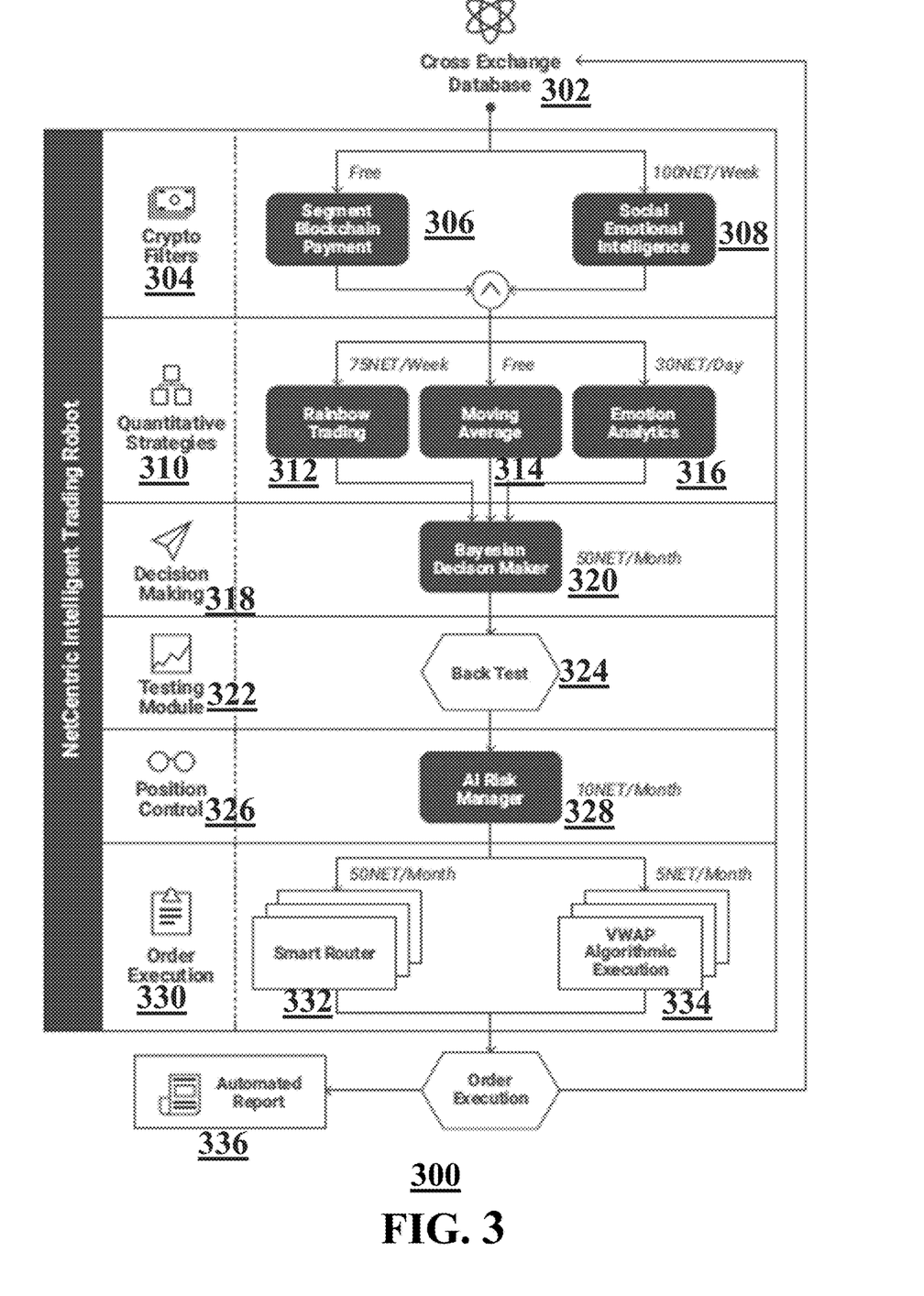
FIG. 3 shows an example of a virtual robot with advanced functions, according to an embodiment.

FIG. 3 shows an example of a virtual robot with advanced functions 300, according to an embodiment. The application server may comprise a virtual robot that links a user's accounts from different exchange platforms with the user's virtual robot application account and save the account information in the cross exchange database 302. The crypto filters 304 of the virtual robot apply a set of filtering rules to determine a subgroup of coins and tokens satisfying the user's requirements. The virtual robot may use segment blockchain payment 306 mechanism to collect fees. The segment blockchain payment 306 may require a particular type of application tokens as the payment, such as NET tokens. The application tokens may be the currency for a user to pay for the virtual robot application services. The user may purchase the application tokens using traditional currencies, such as dollars. Insufficient token balance may trigger a pause for the robot computation and new order submission. The virtual robot may shut down when all opening trading positions are closed.

In one configuration, the virtual robot may provide basic services for free and may collect fees for advanced services. For example, the application server of the virtual robot may allow the user to input parameters and features of the required coins or tokens. The virtual robot may provide the service of determining proper coins or tokens based on the parameters and features for free. In some embodiments, the virtual robot may charge fees for advanced function, such as social emotional intelligence 308. The virtual robot may use social emotional intelligence 308 to determine the average investment attitudes of the user based on user information from social networks and determine the coins and tokens based on the user's investment attitudes. For instance, the virtual robot may charge 100 NET tokens per week for the social emotional intelligence service.

The virtual robot may provide different quantitative strategies 310 for the user. Specifically, the virtual robot may provide the moving average strategy 314 for free, the rainbow trading strategy 312 for 75 NET tokens per week, and the emotion analytics strategy 316 for 30 NET tokens per day. The virtual robot may make investment decisions 318 using Bayesian decision maker 320 and charge for 50 NET tokens per month for the decision making service. The decision making service 318 may make investment decisions based on the quantitative strategies and the filtering rules of the user and automatically perform investments for the user.

The test module 322 of the virtual robot may perform a back test 324 that tests the performance of the investment decisions of and determines the expected return and risk loss of the virtual robot.

The virtual robot may also manage market risks in position control module 326. The position control 326 may use artificial intelligence (AI) manager 328 to determine a maximum investment amount for the virtual robot and manage the allocation the funds in different cryptocurrencies and other digital assets. The virtual robot may charge additional fees for the AI intelligence manager 328 service, for instance, the virtual robot may charge 10NET/month.

The virtual robot may do the trading and execute orders 330. The order execution 330 may be through smart router 332 with a charge of 50 NET tokens per month or VWAP algorithmic execution 334 with a charge of 5 NET tokens per month. With the order executed, the virtual robot may generate automated report 336 that includes a detailed trading report with each trade order execution, and save the report into the cross exchange database 302.

In some embodiments, users may also rent out their robots at a token price of their desire. The users may collect the robot rent on a weekly basis. Renters of the robots may also tip the users and rate the robots after each week's performance.

Figure 4:
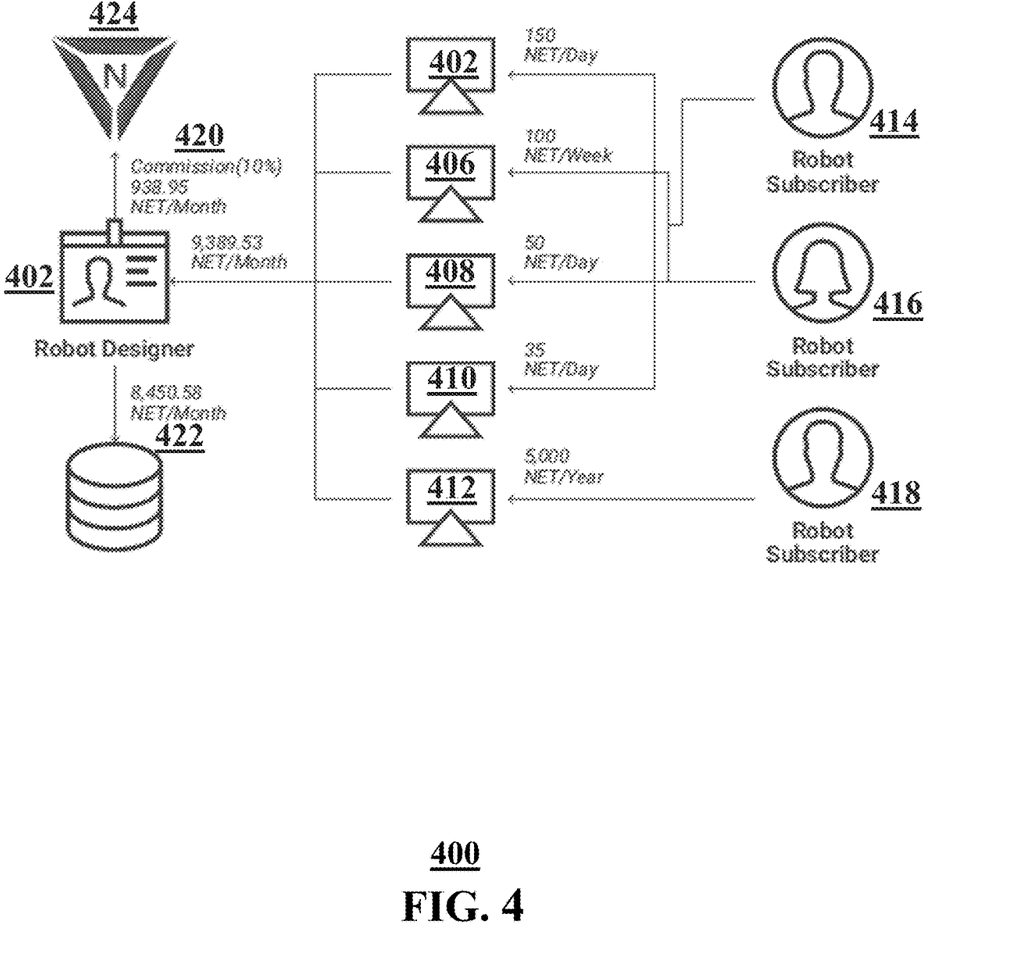
FIG. 4 shows an example of a peer-to-peer virtual robot marketplace, according to an embodiment.

FIG. 4 shows an example of a peer-to-peer virtual robot marketplace 400, according to an embodiment. The peer-to-peer virtual robot market place may allow robot designers to collect application tokens (e.g., NET tokens) as service fees from their robot subscribers. Subscribers are the users subscribing to the virtual robots configured by other users. The example shows a virtual robot subscription. In this example, a robot designer 402 may develop five virtual robots 404, 406, 408, 410, 412. His total revenue is 9,389.53 NET tokens per month from three subscribers 414, 416, 418. The virtual robot application server 424 may collect a commission 420 of 10% of the revenue. As a result, the robot designer may earn a net income 422 of 8,450.75 NET tokens per month. Please note that the amounts of revenues and charges are all randomly generated figures for the purpose of illustration.

The robot marketplace may be crowd-sourced quantitative trading. By inspiring everyone to participate in the development of trading strategies, the application server may bring unlimited and democratized possibilities of trading investment to everyone, from trading experts to novices, as any user can assemble, configure, use, and offer virtual robots on the application platform to other users.

Figure 5:
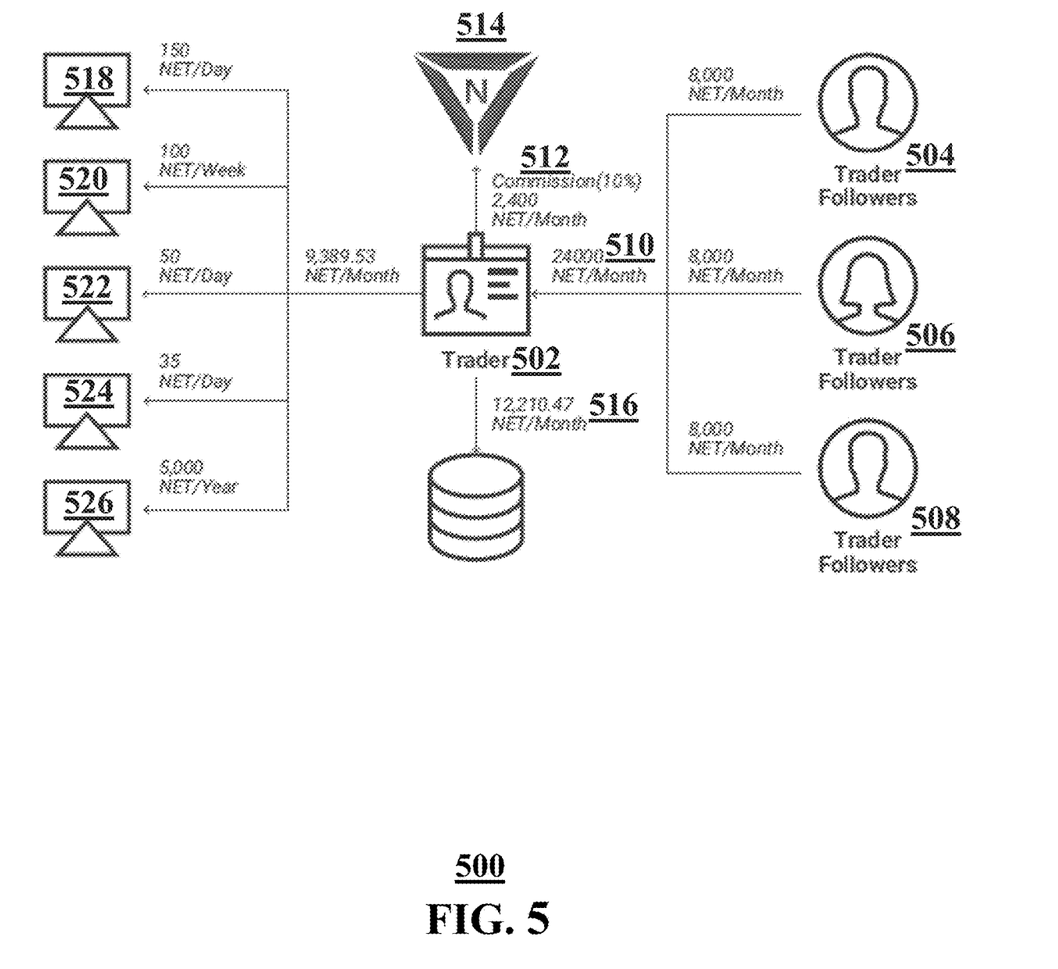
FIG. 5 shows an example of interchangeability in social trading marketplace, according to an embodiment.

FIG. 5 shows an example of interchangeability in social trading marketplace 500, according to an embodiment. The virtual robot application platform allows for evaluation, configuration, instruction, and execution of virtual robots, as well as interaction between designers, subscribers, traders, and trader followers. By removing the obstacles of learning how quantitative trading models work and understanding what goes into automated intelligent trading, the application server may allow users to carry multiple roles at the same time. As shown in the example 500, the trader 502 may have a plurality of trade followers 504, 506, 508 and collect fees from the trade followers 504, 506, 508. The trader 502 may have a total revenue 510 of 24,000 NET tokens per month and pay a commission 512 of 110% of the revenue to the application server 514. As a result, the trader may have a net income 516 of 12,210.45 NET tokens per month. In addition, the trader may pay 9,389.53 NET tokens per month to a robot designer (not shown) to use the one or more virtual robots 518, 520, 522, 524, 526 designed by the robot designer.

Figure 6:
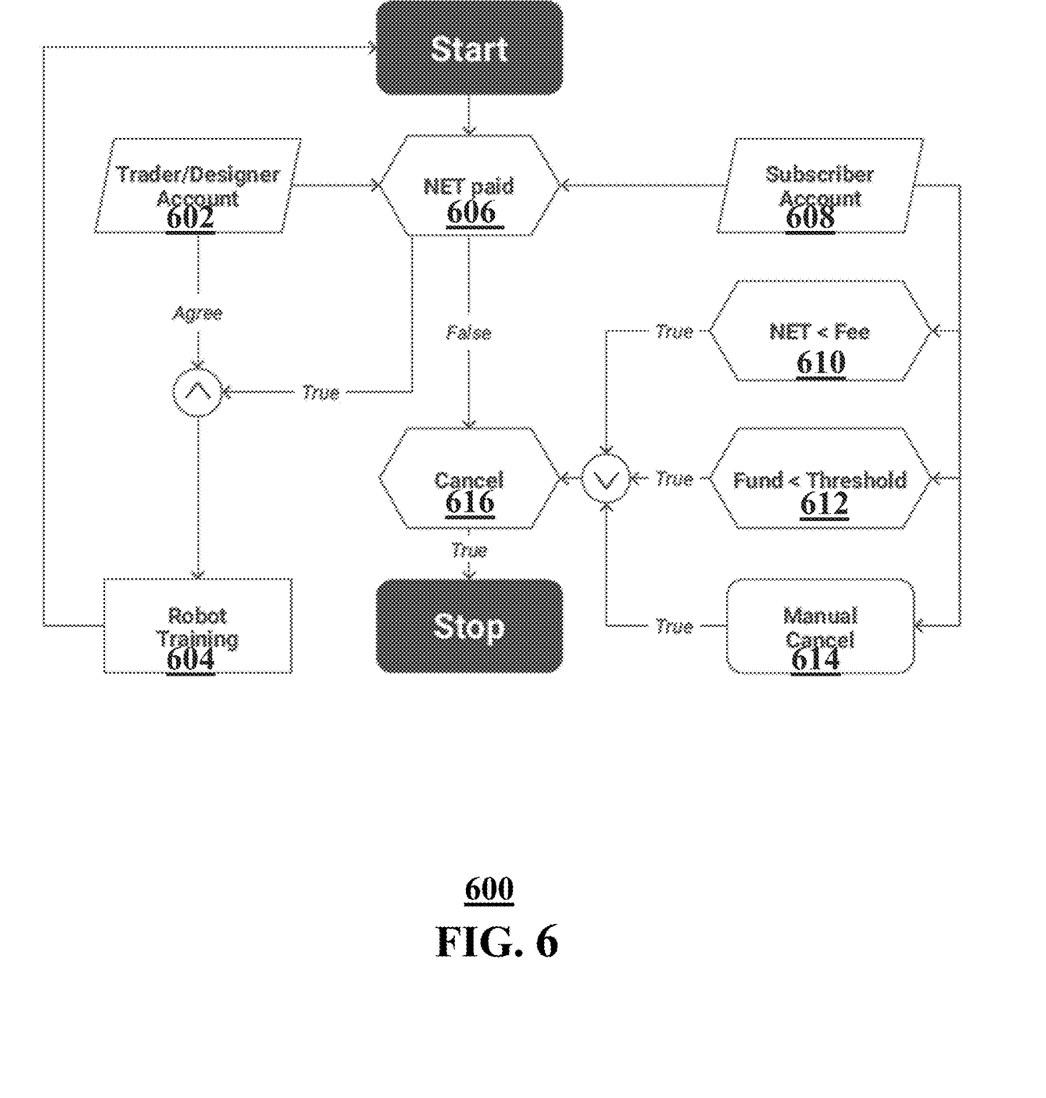
FIG. 6 shows an example of smart contract, according to an embodiment.

FIG. 6 shows an example of smart contract 600, according to an embodiment. To maintain the virtual robot ecosystem, all robot subscriptions that include application token (e.g., NET tokens) transactions will be executed by smart contracts. The smart contract may comprise rules in blockchain between traders, designers, and subscribers. Similar to the quantitative trading procedures, the execution of the smart contract may be also automated and immutable.

A standard procedure may start from the trader/designer 602 executing a subscription agreement. Then the application server may launch virtual robot 604 when confirming an application token payment 606 from the subscriber. The smart contract may dynamically check the subscriber's account balance 608. If the subscriber's balance becomes insufficient to pay for the subscription 610, investable balance is below a threshold 612, or manual cancellation occurs 614, the robot may close all the opening positions 616 and stop trading.

The implementation of smart contracts may facilitate decentralized financial trading services by ensuring counterparty authenticity. Because each party's credit history and performance are automatically recorded and immutable on the blockchain, users no longer need to worry about dishonest participants. In addition, automated conditional programming execution allows and ensures anonymous and faithful execution of the subscription contract.

Figure 7:
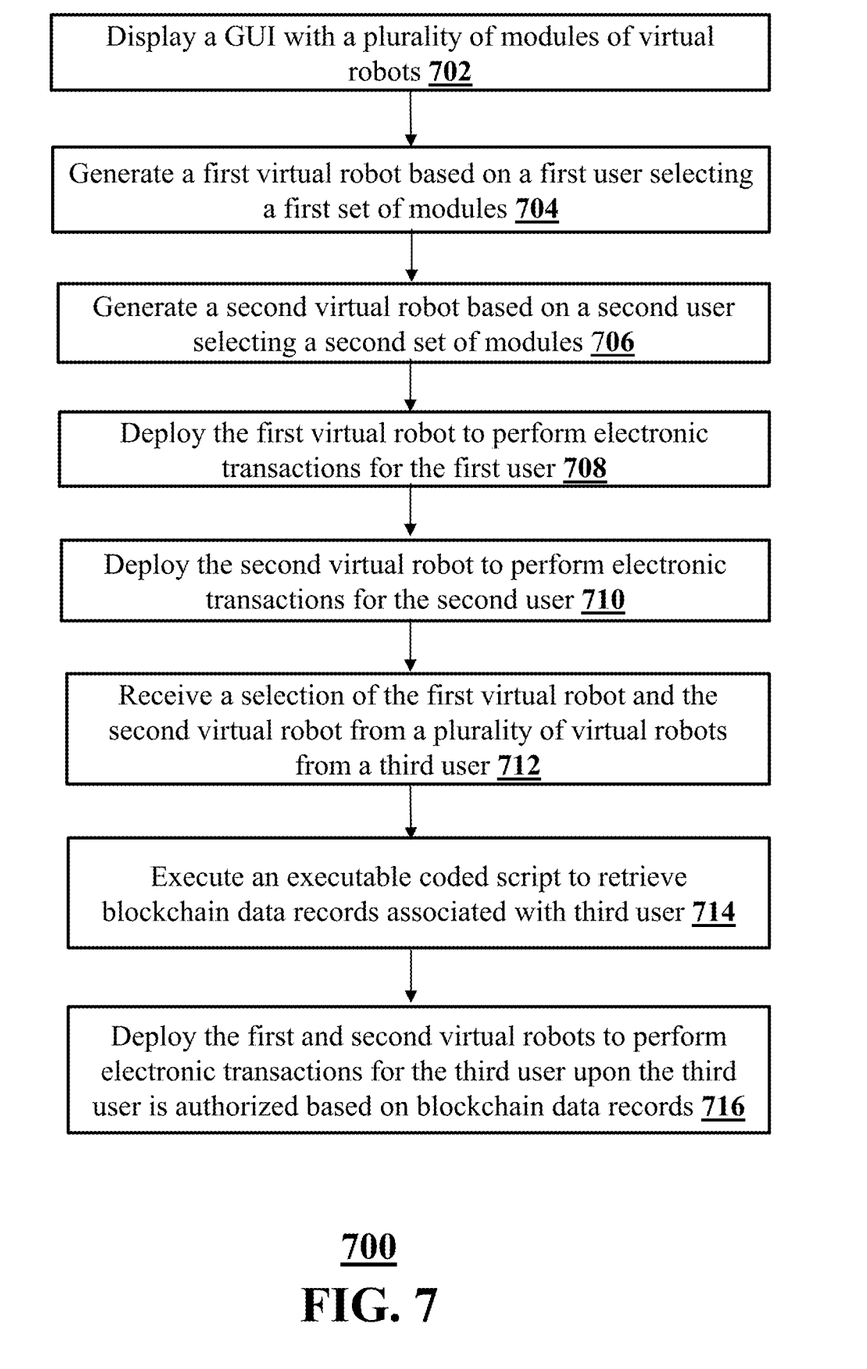
FIG. 7 shows a flow diagram of an illustrative method for configurable robots, according to an embodiment.

FIG. 7 shows a flow diagram of an illustrative method 700 for configurable robots, according to an embodiment. It should be understood the steps shown and described herein are merely illustrative and additional, alternative, and fewer number of steps should be considered to be within the scope of this disclosure. Although multiple computing systems may implement one or more of the steps, the following details, for brevity, a single computer executing the steps of the method 700.

At step 702, the application server may display a graphical user interface (GUI) with a plurality of modules of virtual robots. The plurality of modules may be configured to be form one or more virtual robots. Each of the virtual robots may perform a plurality of automated electronic transactions. The virtual robots are the virtual robots that perform wealth management by making electronic transactions for investment. The plurality of modules of the virtual robots may comprise: cross exchange data source module, cryptocurrency filter module, quantitative strategy module, decision making module, back testing module, position control module, order execution module, and report generation module. Within each module, the application server may provide different executable functions. For example, within the quantitative strategy module, there may be different executable functions covering a variety of investment styles including momentum, mean-reverting, event driven, relative value, arbitrage, buy and hold, long and short, and the like.

At step 704, the application server may generate a first virtual robot based on a first user selecting a first set of modules from the plurality of modules. The first user may further select corresponding executable functions in each module in the first set of modules. The first user may interact with the GUI to select a first set of modules and executable functions in each module based on the user's requirements and preferences. For example, the first user may select the cross exchange data source module to allow the application server to link the user's accounts from other exchange platforms and integrate different accounts for wealth management. In another example, the first user may be willing to take risks for a higher return rate. As a result, the user may select the quantitative strategy module and further select the more aggressive strategies with high risk and high reward functions. Based on the first user's selection and configuration, the application server may generate the first virtual robot (e.g., virtual robot). The first virtual robot may make investment decisions using the user selected modules and strategies.

At step 706, the application server may generate a second virtual robot based on a second user selecting a first set of modules from the plurality of modules. The second user may further select corresponding executable functions in each module in the second set of modules. For example, the second user may not be willing to take high risks. As a result, the user may select the quantitative strategy module and further select the more conservative strategies with low risk and low reward functions. Based on the first user's selection and configuration, the application server may generate the second virtual robot (e.g., virtual robot). The second virtual robot may make dynamic investment decisions using the user selected modules and strategies.

At step 708, the application server may deploy the first virtual robot to perform automated electronic transactions on different digital assets for the first user in an electronic transaction platform based upon a first deployment instructions received from the first user. The first virtual robot (e.g., virtual robot) may perform the automated electronic transactions in different cryptocurrencies within the maximum amount for each cryptocurrency, as instructed by the first user. For example, the application server may provide a GUI for the first user to assign a certain amount of tokens or cryptocurrencies to the first virtual robot or manage the allocation of funds. Based on the user's instruction, the first virtual robot may take 10 bitcoins and 20 tokens as the maximum amount. The first virtual robot may use the selected modules and strategies to make dynamic investment decisions for each cryptocurrency and perform the automated electronic transactions according to the investment decisions and the user instructions.

At step 710, the application server may deploy the second virtual robot to perform electronic transactions on different digital assets for the second user in the electronic transaction platform based upon a second deployment instructions received from the second user. The second virtual robot (e.g., virtual robot) may perform the automated electronic transactions in different cryptocurrencies within the maximum amount for each cryptocurrency, as instructed by the second user. For example, the application server may provide a GUI for the second user to assign a certain amount of tokens or cryptocurrencies to the second virtual robot or manage the allocation of funds. Based on the user's instruction, the second virtual robot may take five bitcoins and eight tokens as the maximum amount. The second virtual robot may use the selected modules and strategies to make investment decisions for each cryptocurrency, and perform the automated electronic transactions according to the investment decisions and the user instructions.

At step 712, the application server may receive a selection of the first virtual robot and the second virtual robot from a plurality of virtual robots from a third user. In some embodiments, the application server may allow the virtual robot creators to rent out their robots. The application server may provide a GUI comprising a plurality of virtual robots available for renting, including the first virtual robot and the second virtual robot. The third user may rent the first user's first virtual robot and the second user's second virtual robot by interacting with the GUI and selecting the first and second virtual robots.

In addition to renting out the virtual robots, a user may sell trading signals generated by the virtual robots. The trading signal may be a suggestion for entering a trade on a currency pair, usually at a specific price and time. Because the trading signals include financial information that is valuable for non-professional, a user may also offer trading signals generated by customized virtual robots for other users to purchase. For example, the application server may provide a GUI comprising a plurality of trading signals generated by the first and second virtual robots to allow the first user and the second user to sell the trading signals. The third user may purchase some of the signals by selecting signals from the plurality of trading signals.

At step 714, the application server may execute an executable coded script to retrieve blockchain data records associated with the third user. The blockchain data records may be smart contract for managing account balance. The third user who rents the first and second virtual robots may need to pay for the service provided by the first and second virtual robots. The application server may execute an executable coded script to retrieve blockchain data records of the third user and determine the third user's account balance.

At step 716, the application server may deploy the first and second virtual robots to perform electronic transactions for the third user in the electronic transaction platform in response to the application server determining based upon the blockchain data records that the third user is authorized to utilize the first virtual robot and the second virtual robot. Specifically, after the application server retrieves the blockchain data records, the application server may determine if the third user has a balance that is sufficient to pay for the rent. If the third user has a balance that is sufficient to pay for the rent, the application server may determine that the third user is authorized to utilize the first and second virtual robots. The application server may deploy the first and second virtual robots to make investment decisions and perform electronic transactions for the third user in the electronic transaction platform.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
    displaying, by a computer, a graphical user interface having a plurality of modules configured to form one or more virtual robots, wherein each of the one or more virtual robots performs a plurality of automated electronic transactions;
    upon a user selecting on the graphical user interface a set of modules from the plurality of modules and further selecting corresponding executable functions in each module within the set of modules, deploying, by the computer, a virtual robot of the one or more virtual robots to perform automated electronic transactions for the user in an electronic transaction platform based upon a deployment instruction received from the user;
    upon receiving a request from a second user, executing, by the computer, an executable coded script to retrieve blockchain data records associated with the second user; and
    deploying, by the computer, the virtual robot to perform automated electronic transactions for the second user in the electronic transaction platform in response to the computer determining based upon the blockchain data records that the second user is authorized to utilize the virtual robot.

2. The method of claim 1, further comprising:
    executing, by the computer, a machine learning algorithm comprising at least one of Bayesian inference, neural networks, support vector machines, and deep learning, wherein the machine learning algorithm trains the virtual robot to make decisions regarding the automated electronic transactions.

3. The method of claim 1, further comprising:
    executing, by the computer, a plurality of strategies to output binary decisions regarding the automated electronic transactions performed by the virtual robot.

4. The method of claim 1, further comprising:
    periodically determining, by the computer, a power value for each user based at least on one of token holdings, referral rewards, or contributions of the user; and
    providing, by the computer, priority of access to the virtual robot to the second user based on the second user's power value.

5. The method of claim 1, further comprising:
    receiving, by the computer, a balance threshold; and
    deploying, by the computer, the virtual robot to perform automated electronic transactions when an account associated with the second user satisfies the balance threshold.

6. The method of claim 1, wherein deploying the virtual robot comprises:
    accessing, by the server, one or more third party accounts associated with the second users, whereby the virtual robot performs automated electronic transactions associated with the one or more third party account.

7. The method of claim 1, further comprising:
    generating, by the computer, a report for the user comprising records corresponding to the automated electronic transactions performed by the virtual robot.

8. The method of claim 1, wherein the automated electronic transactions comprise transactions on tokens or cryptocurrencies.

9. The method of claim 1, further comprising:
executing, by the computer, smart contract that dynamically checks the second user's account balance.

10. The method of claim 1, further comprising:
displaying, by the computer, a plurality of signals generated by the virtual robot; and
receiving, by the computer, a selection of signals from the plurality of signals from the second user.

11. A system comprising:
a server comprising a processor and a non-transitory computer-readable medium containing instructions that when executed by the processor causes the processor to perform operations comprising:
display a graphical user interface having a plurality of modules configured to form one or more virtual robots, wherein each of the one or more virtual robots performs a plurality of automated electronic transactions;
upon a user selecting on the graphical user interface a set of modules from the plurality of modules and further selecting corresponding executable functions in each module within the set of modules, deploy a virtual robot of the one or more virtual robots to perform automated electronic transactions for the user in an electronic transaction platform based upon a deployment instruction received from the user;
upon receiving a request from a second user, execute an executable coded script to retrieve blockchain data records associated with the second user; and
deploy the virtual robot to perform automated electronic transactions for the second user in the electronic transaction platform in response to the computer determining based upon the blockchain data records that the second user is authorized to utilize the virtual robot.

12. The system of claim 11, wherein the instructions are further configured to cause the processor to:
execute a machine learning algorithm comprising at least one of Bayesian inference, neural networks, support vector machines, deep learning to make decisions regarding the automated electronic transactions performed by virtual robots.

13. The system of claim 11, wherein the instructions are further configured to cause the processor to:
combining a plurality of strategies to make binary decisions regarding the automated electronic transactions performed by the virtual robot.

14. The system of claim 11, wherein the instructions are further configured to cause the processor to:
periodically determine a power value for each user based at least on one of token holdings, referral rewards, or contributions of the user; and
provide priority of access to the virtual robot to the second user based on the second user's power value.

15. The system of claim 11, wherein the instructions are further configured to cause the processor to:
receive a balance threshold;
deploy the virtual robot to perform automated electronic transactions when an account associated with the second user satisfies the balance threshold.

16. The system of claim 11, wherein deploying the virtual robot comprises accessing one or more third party accounts associated with the second users, whereby the virtual robot performs automated electronic transactions associated with the one or more third party account.

17. The system of claim 11, wherein the instructions are further configured to cause the processor to:
generate a first report for the user comprising records corresponding to the automated electronic transactions performed by the virtual robot.

18. The system of claim 11, wherein the automated electronic transactions comprise transactions on tokens or cryptocurrencies.

19. The system of claim 11, wherein the instructions are further configured to cause the processor to:
execute smart contract that dynamically checks the second user's account balance.

20. The system of claim 11, wherein the instructions are further configured to cause the processor to:
display a plurality of signals generated by the virtual robot; and
receive a selection of signals from the plurality of signals from the second user.

* * * * *